US009195899B2

(12) United States Patent
Topfer et al.

(10) Patent No.: US 9,195,899 B2
(45) Date of Patent: Nov. 24, 2015

(54) SELF CORRECTING PORTABLE DIGITAL RADIOGRAPHY DETECTOR, METHODS AND SYSTEMS FOR SAME

(75) Inventors: Karin Topfer, Rochester, NY (US); Jeff Hsin Chang, Rochester, NY (US); Gregory N. Heiler, Hilton, NY (US)

(73) Assignee: Carestream Health, Inc., Rochester, NY (US)

( * ) Notice: Subject to any disclaimer, the term of this patent is extended or adjusted under 35 U.S.C. 154(b) by 202 days.

(21) Appl. No.: 13/349,881

(22) Filed: Jan. 13, 2012

(65) Prior Publication Data
US 2013/0182934 A1 Jul. 18, 2013

(51) Int. Cl.
G06K 9/38 (2006.01)
G06K 9/40 (2006.01)
G06T 5/00 (2006.01)
H04N 5/32 (2006.01)
H04N 5/361 (2011.01)
H04N 5/367 (2011.01)

(52) U.S. Cl.
CPC .. G06K 9/38 (2013.01); G06K 9/40 (2013.01); G06T 5/005 (2013.01); H04N 5/32 (2013.01); H04N 5/361 (2013.01); H04N 5/367 (2013.01); G06T 2207/10116 (2013.01); G06T 2207/10124 (2013.01); G06T 2207/30004 (2013.01)

(58) Field of Classification Search
CPC ............ G06K 9/38; G06K 9/40; G06T 5/005; G06T 2207/10116; G06T 2207/10124; G06T 2207/30004; H04N 5/32; H04N 5/361; H04N 5/367
USPC ................ 382/132, 218; 378/207; 250/252.1, 250/370.09
See application file for complete search history.

(56) References Cited

U.S. PATENT DOCUMENTS

| | | | |
|---|---|---|---|
| 6,333,991 B1 | 12/2001 | Schreiber et al. | |
| 6,529,622 B1 | 3/2003 | Pourjavid | |
| 6,693,668 B1 | 2/2004 | May et al. | |
| 6,720,594 B2* | 4/2004 | Rahn et al. | 257/291 |
| 6,747,697 B1 | 6/2004 | Lin et al. | |
| 6,919,568 B2 | 7/2005 | Odogba et al. | |
| 6,931,098 B2* | 8/2005 | Kump et al. | 378/98.9 |
| 7,090,133 B2* | 8/2006 | Zhu | 235/462.01 |
| 7,138,636 B2* | 11/2006 | Petrick et al. | 250/370.09 |
| 7,362,916 B2 | 4/2008 | Yamazaki | |
| 7,476,027 B2* | 1/2009 | Takenaka et al. | 378/207 |
| 7,519,156 B2* | 4/2009 | Marar | 378/116 |

(Continued)

OTHER PUBLICATIONS

Zhao et al., "Investigation of lag and ghosting in amorphous selenium flat-panel x-ray detectors", Medical Imaging 2002: Physics of Medical Imaging, Proceedings of SPIE vol. 4682, 9-20.*

(Continued)

Primary Examiner — Katrina Fujita

(57) ABSTRACT

Embodiments of radiographic imaging systems and/or methods can monitor the state of calibration of a digital x-ray detector, the detector including a solid state sensor with a plurality of pixels, an optional scintillating screen and at least one embedded microprocessor. In one embodiment, a method can use a computer or the embedded microprocessor or both, for setting a calibration operating mode of the portable detector; taking a plurality of dark images in the calibration mode; determining a dark difference image between pixel readings between two of the plurality of dark images; identifying pixels in the dark difference image that differ by over a threshold amount from at least some surrounding pixels in the dark difference image as defective pixels.

20 Claims, 15 Drawing Sheets

(56) References Cited

U.S. PATENT DOCUMENTS

| | | |
|---|---|---|
| 7,602,951 B2 | 10/2009 | Hsieh et al. |
| 7,819,581 B2 * | 10/2010 | Srinivasan et al. ............ 378/207 |
| 7,832,928 B2 | 11/2010 | Topfer et al. |
| 7,873,144 B2 * | 1/2011 | Luhta et al. .................. 378/98.8 |
| 8,446,495 B2 * | 5/2013 | Mochizuki et al. ............ 348/241 |
| 8,809,796 B2 * | 8/2014 | Jung ........................ 250/370.09 |
| 8,829,438 B2 * | 9/2014 | Sato et al. .................. 250/336.1 |
| 8,894,280 B2 * | 11/2014 | Topfer et al. ................. 378/207 |
| 2006/0280377 A1 | 12/2006 | Kimura |
| 2007/0165934 A1 | 7/2007 | Maac et al. |
| 2009/0129659 A1 | 5/2009 | Deutschmann |
| 2011/0057802 A1 | 3/2011 | Topfer et al. |
| 2011/0255666 A1 * | 10/2011 | Liu et al. ......................... 378/91 |
| 2013/0001426 A1 * | 1/2013 | Tredwell et al. ......... 250/370.09 |
| 2014/0010353 A1 * | 1/2014 | Lalena ............................ 378/98 |

OTHER PUBLICATIONS

J. Anthony Siebert, et al. "Flat-field correction technique for digital detectors," SPIE vol. 3336, Feb. 1998, pp. 348-354.

J.P. Moy, et al., "How does real offset and gain correction affect the DQE in images from X-ray Flat detectors," SPIE vol. 3659, Feb. 1999, pp. 90-97.

ASTM International, "Standard Practice for Manufacturing Characterization of Digital Detector Arrays[1],"Designation: E2597, Apr. 2008, 19 pages.

International Search Report for International Application No. PCT/US2012/068116 mailed Mar. 25, 2013, 3 pages.

* cited by examiner

SELF CORRECTING PORTABLE DIGITAL RADIOGRAPHY DETECTOR, METHODS AND SYSTEMS FOR SAME

FIELD OF THE INVENTION

This invention generally relates to digital radiography (DR) imaging and more particularly relates to DR detector calibration and/or recalibration.

BACKGROUND OF THE INVENTION

Digital Radiography (DR) detectors directly transform received exposure energy to digital image data. These detectors commonly contain an array of light sensitive picture elements, or pixels, arranged in a matrix of rows and columns and a scintillator, consisting of a material, such as gadolinium oxysulfide, Gd2O2S:Tb (GOS) or cesium iodide (CsI), that absorbs x-rays incident thereon and converts the x-ray energy to visible light photons. In some configurations, the scintillator is in direct contact with the light sensitive array. The array of light sensitive elements can be any type of solid state sensor, such as a flat panel detector, a charge-coupled device, or CMOS detector. The light sensitive material converts the incident light into electrical charge which is stored in the internal capacitance of each pixel. The magnitude of the stored electrical charge is related to the intensity of the excited light, which is, in turn, related to the intensity of the incident x-rays. The radiation image exposures captured on radiation-sensitive layers are converted, pixel by pixel, to electronic image data which is then stored in memory circuitry for subsequent read-out and display on suitable electronic image display devices.

Much like video sensors and other types of two-dimensional solid state image detectors, DR detectors include several thousands of picture elements, or pixels. Inevitably, some number of pixels is found to be defective. Compensation techniques such as defect mapping and corrective image processing allow the use of DR detectors having defective pixels, provided that such pixels can be detected (e.g., number is relatively small) and proper steps taken for correcting the image.

Defect mapping and correction procedures are commonly coupled with gain and offset calibration, which compensate for pixel-to-pixel variations in sensitivity and dark current. The most basic calibration and correction algorithms generally include two steps as taught by James A. Seibert, John M. Boone, and Karen K. Lindfors in "Flat-field correction technique for digital detectors," Proc. SPIE Vol. 3336, 1998, p. 348-354. First, the dark signal of the detector (that is, the signal in the absence of any x-ray exposure) is obtained. Pixel by pixel variations in the dark signal of the detector are characterized to form a dark or offset map containing the dark variations. The offset map is then subtracted from the x-ray exposure in a process termed dark or offset correction. Secondly, variations in the sensitivity of the pixels are characterized. This is done by capturing one or more flat field exposures, which are then offset-corrected. The resulting image is the gain map. In the gain correction step, the offset-corrected x-ray exposure is divided by the gain map. Ideally, this two-step procedure compensates for any fixed pattern noise introduced by the detector.

Defect identification methods often explore anomalies in the gain and offset maps produced during calibration, for example by identifying pixels with gain and offset values that differ significantly from their surroundings, and by setting upper and lower thresholds for allowable values in gain and offset maps, to update the defect maps for a given detector.

Examples for this type of defect identification are given in ASTM Standard E2597, "Standard Practice for Manufacturing Characterization of Digital Detector Arrays" (2008) and U.S. Pat. No. 7,602,951 by Hsieh et al., "Method and system for providing defective cell correction in a medical imaging device". Thus, periodic recalibration can help to manage defective pixels with related art DR detectors and can help to produce corrected images with few, if any, visible defective pixels.

Related art DR detectors generally accumulate few additional defective pixels over time and require infrequent recalibration. These detectors are often permanently mounted on a wall stand, in an examination table or some type of gantry or other type of adjustable framework that provides a secure mechanical mount (e.g., or tether) for positioning the detector behind the patient and at a proper disposition with respect to the x-ray source.

Because of normal and rough handling of portable radiographic detectors, the required intervals between calibration procedures, needed for maintaining suitable image quality, are less predictable for fully portable detectors. One solution would be simply to require more frequent calibration for these units. Calibration could thus be required, for example, after a certain number of images were taken. However, this type of arbitrary interval negatively impacts productivity. Most calibration procedures require x-ray exposures and therefore radiology staff time and attention and each calibration reduces the overall utilization time of the DR detector.

Clearly, there is a need to monitor the calibration state of the detector during regular clinical operation and to alert the user when calibration is needed, but calibration effectively disrupts operator workflow and increases access time for obtaining the current fully corrected clinical image. This disruption and time loss may be unacceptable in many clinical environments. In critical situations, such as in the emergency room or intensive care unit, for example, valuable time would be lost. Methods have been disclosed for updating defects exclusively from dark images, which can be done without operator intervention and while the detector is idle. See for example, May et al. in U.S. Pat. No. 6,693,668 titled "Self-diagnostic image sensor" or U.S. Pat. No. 7,362,916 by Yamazaki, entitled "Radiation imaging method, radiation imaging apparatus, computer program and computer-readable recording medium". Other methods have been disclosed that identify new defects directly from radiographic images, which can also be done without operator involvement. See for example, US patent application US20070165934A1 by Maac and Kloessner entitled "Device and method for correcting defects in x-ray images" or U.S. Pat. No. 6,919,568 by Odogba et al., entitled "Method and apparatus for identifying composite defective pixel map". However, these methods are generally more computationally intensive and not 100% reliable because the defects have to be identified within the image content. This overhead affects every captured image and may increase image access time.

In summary, while there are some indications that related art pixel defect detection methods may perform well enough when used within more permanent DR detector installations, these same methods do not appear to successfully address particular requirements and workflow of the portable DR detector. There is, thus, a need for improved defect identification and correction for portable DR detectors.

SUMMARY OF THE INVENTION

Accordingly, it is an aspect of this application to address in whole or in part, at least the foregoing and other deficiencies in the related art.

It is another aspect of this application to provide in whole or in part, at least the advantages described herein.

It is another aspect of this application to provide a radiographic imaging apparatus and/or methods that can provide a calibration mode operating to perform field calibration updates without operator intervention.

It is another aspect of this application to provide a radiographic imaging apparatus and/or methods that can provide a calibration mode using dark imaging characteristics of pixels in a radiographic imaging array to determine defective pixels.

It is another aspect of this application to provide a radiographic imaging apparatus and/or methods that can provide a calibration mode using dark difference images, dark current saturation or dark current lag of pixels in a radiographic imaging array to determine defective pixels.

It is another aspect of this application to advance the art of diagnostic imaging, particularly as related to the use of portable digital radiography detectors.

In accordance with one embodiment, a method for monitoring the state of calibration of a digital x-ray detector, the detector including a solid state sensor with a plurality of pixels, a scintillating screen and at least one embedded microprocessor, the method including using a signal processing device, that can include setting a calibration operating mode of the portable detector; taking a plurality of dark images in the calibration mode; determining a dark difference image between pixel readings between two of the plurality of dark images; identifying pixels in the dark difference image that differ by over a threshold amount from at least some surrounding pixels in the dark difference image as defective pixels.

In accordance with one embodiment, a system for monitoring the state of calibration of a digital x-ray detector, the detector including a solid state sensor with a plurality of pixels and at least one embedded microprocessor, the system can include a computer operable during normal diagnostic use of the detector for accessing a digital image including digital image data of the detector; the at least one embedded microprocessor configured to set a calibration operating mode of the portable detector; means for initializing the portable detector in the calibration mode and taking a plurality of dark images in the calibration mode; the at least one embedded microprocessor or the computer configured to determine a dark difference image between pixel readings of two of the plurality of dark images and identify pixels in the dark difference image that differ by over a threshold amount from at least some surrounding pixels in the dark difference image as defective pixels.

These objects, features, and advantages are given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

DESCRIPTION OF EXEMPLARY EMBODIMENTS

Figure 1:
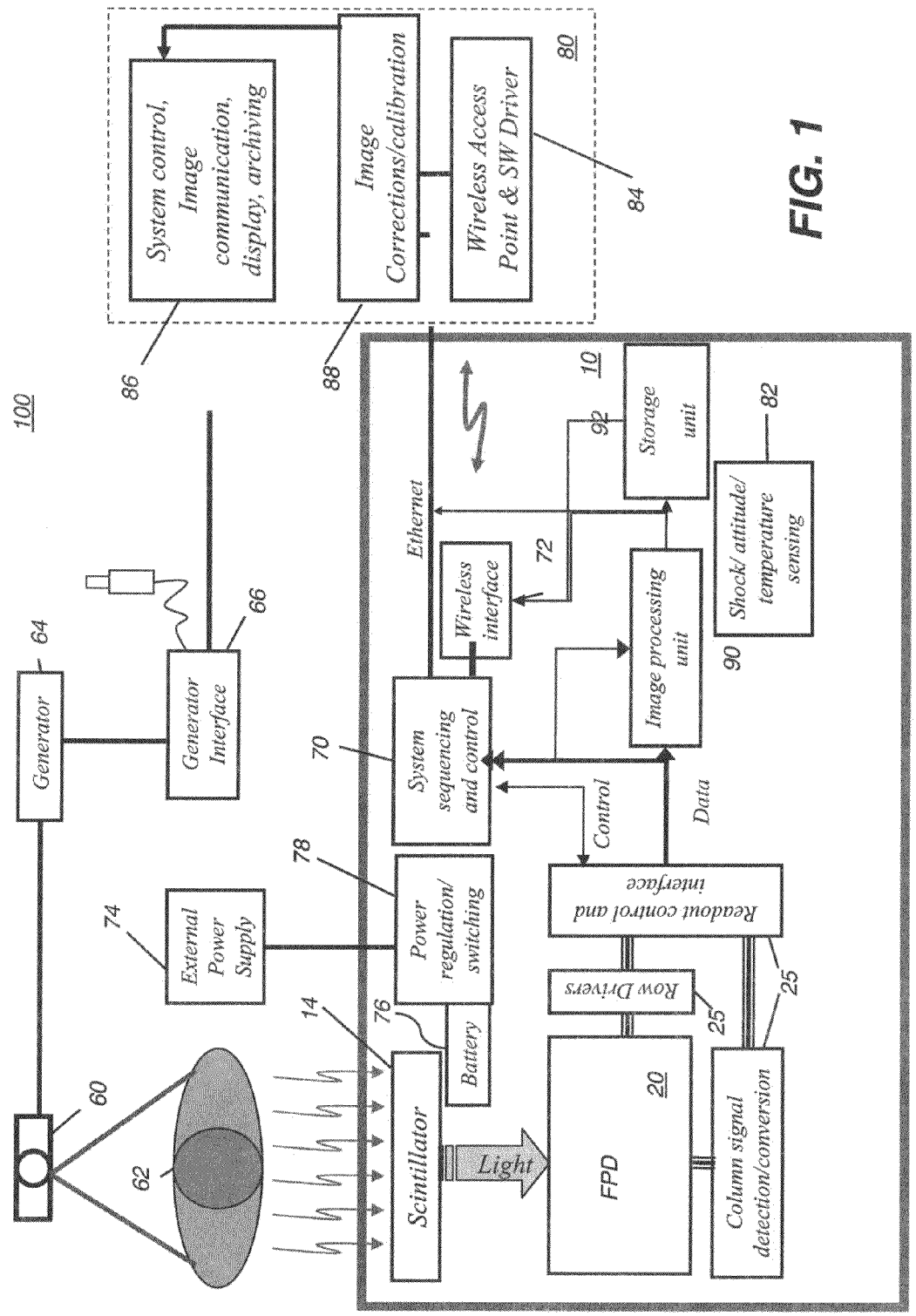
FIG. 1 is a schematic diagram that shows the architecture of a radiographic system using a portable DR detector.

The following is a description of exemplary embodiments, reference being made to the drawings in which the same reference numerals identify the same elements of structure in each of the several figures, and similar descriptions concerning components and arrangement or interaction of components already described are omitted. Where they are used, the terms "first", "second", and so on, do not necessarily denote any ordinal or priority relation, but may simply be used to more clearly distinguish one element from another.

An embodiment of a digital radiographic (DR) imaging system and particular features for a portable DR detector are described with reference to FIG. 1. The schematic diagram of FIG. 1 shows, at a high level, an architecture of a radiographic imaging system 100 that can use a portable DR detector 10. An x-ray source 60, with a supporting generator 64 and a generator interface 66 directs radiation toward a patient or other object 62 and toward DR detector 10. Components of DR detector 10 can include a scintillator screen 14 that responds to the radiation by emitting light to a flat-panel detector (FPD) 20 that is a two-dimensional array of sensing pixels. Row and column readout elements 25, can obtain the sensed data under control of commands from a control logic processor 70, such as an embedded microprocessor. In addition the detector can contain an embedded image processing unit, 90, for processing the acquired data and internal or removable storage, 92, for storing acquired and processed data. Output image data can be provided to an external host computer 80 over a data link, such as a wireless interface 72 in the embodiment shown. A cable connection could alternately be supplied for this data link. Data can originate directly from the readout unit 25, the image processor, 90, or the storage unit 92. An external power supply 74 or on-board battery 76 provides source power to a power regulator 78.

Optional sensors 82 can be provided for shock, temperature, and device orientation. Shock sensor 82 can be used for monitoring mechanical shock to the detector. For example, shock detection can be used by control logic processor 70 to alert a system user to conduct a calibration of the detector when a preselected shock threshold value has been exceeded. Temperature detection can operate similarly to signal needed calibration of the detector when a preselected upper or lower temperature threshold value has been exceeded. Either or both, shock and temperature events can lead to loss of calibration of the detector. In the embodiment of FIG. 1, host computer 80 has a wireless interface 84 or other suitable interface for cabled data connection, for example 100base-T Ethernet, control circuitry 86, and image correction and calibration circuitry 88 for control and processing of image data such as obtained from DR detector 10. A display screen (not shown) can be provided for viewing image data and for reporting information relevant to DR detector 10.

Figure 2A:
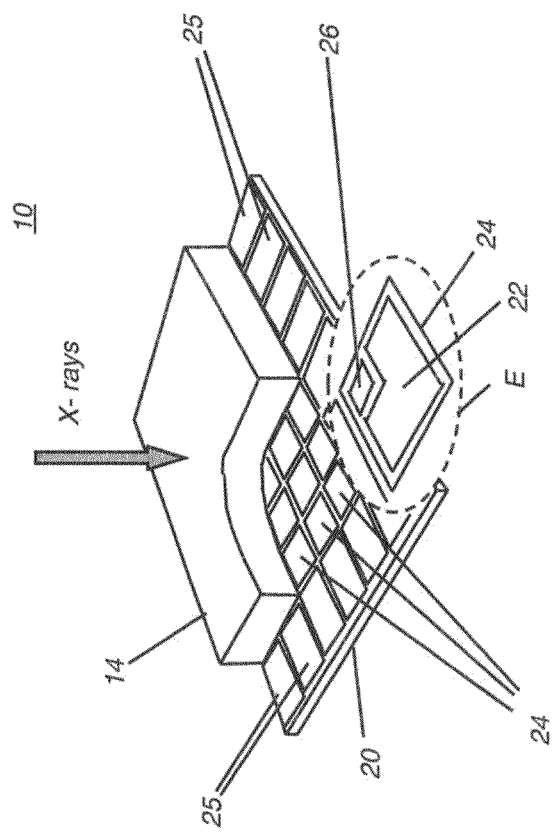
FIG. 2A is a diagram that shows a perspective, partial cutaway view showing a portion of a related art DR detector.

The perspective view of FIG. 2A shows a partial cutaway view of a small edge portion of DR detector 10 of the indirect type. A scintillator screen 14 responds to incident x-ray radiation by generating visible light that is in turn detected by a flat panel detector 20. Detector 20 has a two-dimensional array having many thousands of radiation sensitive solid-state sensor pixels 24 that are arranged in a matrix of rows and columns and are connected to readout element 25. Readout element 25 can include an ASIC (Application-Specific Integrated Circuit) or ASIC chip. As shown at enlarged section E, each pixel 24 has one or more photosensors 22, such as a PIN diode or other light-sensitive component, and an associated switch element 26 of some type, such as one or more thin film transistors, or TFTs. To read out image information from the panel, each row of pixels 24 can be selected sequentially and the corresponding pixel on each column can be connected in its turn to a charge amplifier (not shown). The outputs of the charge amplifiers from each column can then be applied to ASIC chips and related circuitry that generate digitized image data that then can be stored and suitably image-processed as needed for subsequent storage and display. In one embodiment, flat panel detector 20, photosensors 22, pixel 24, readout element 25, and an associated switch element 26 can form the imaging array.

Figure 2B:
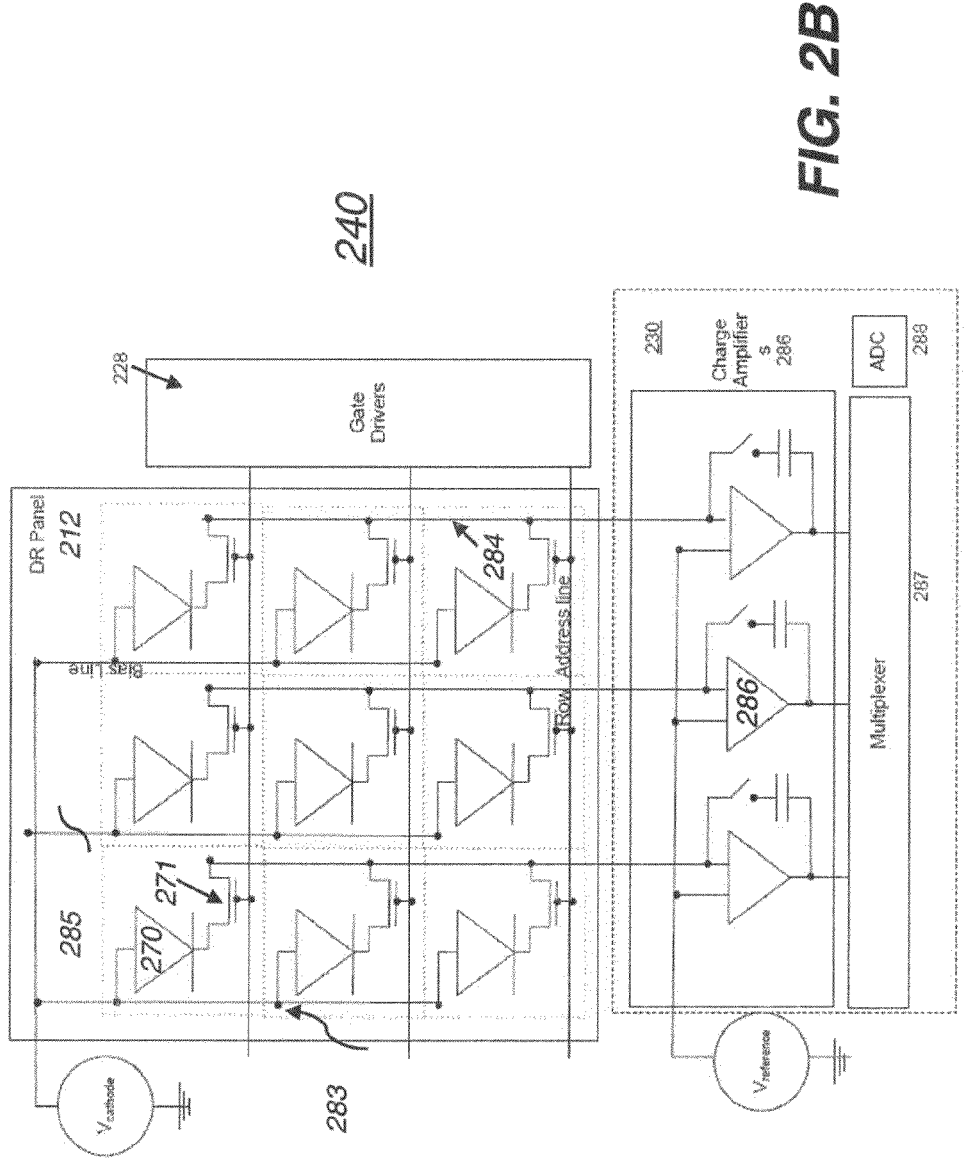
FIG. 2B is a diagram that shows a schematic of a portion of a related art DR detector imaging array.

FIG. 2B is a diagram that shows a schematic of a portion of an imaging array for a radiographic detector. As shown in FIG. 2B, a schematic of a portion of an exemplary flat panel imager 240 can include an array 212 having a number of a-Si:H n-i-p photodiodes 270 and TFTs 271. Gate driver chips 228 can connect to the blocks of gate lines 283, readout chips 230 can connect to blocks of data lines 284, and bias lines 285 can connect to a bias bus or variable bias reference voltage. Charge amplifiers 286 can be provided that receive signals from the data lines. An output from the charge amplifiers 286 can go to an analog multiplexer 287 or directly to an analog-to-digital converter (ADC) 288 to stream out the digital image data at desired rates.

The term calibration includes but is not limited to typical elements of the detector flat-field calibration known in the art (James A. Seibert, John M. Boone, and Karen K. Lindfors in "Flat-field correction technique for digital detectors," *Proc. SPIE Vol.* 3336, 1998, p. 348-354; by Jean-Pierre Moy and B. Bosset in "How does real offset and gain correction affect the DQE in images from x-ray flat detectors?" *Proc. SPIE*, 3659, 1999, pp. 90-97). The most basic calibration and correction algorithms generally include 3 steps. First, the dark signal of the detector (that is, the signal in the absence of any x-ray exposure) is obtained. Pixel by pixel variations in the dark signal of the detector are characterized to form a dark or offset map containing the dark variations. The offset map is then subtracted from the x-ray exposure in a process termed dark or offset correction. Second, the variations in the sensitivity of the pixels are characterized. This is done by capturing one or more flat field exposures, which are then offset-corrected. The resulting image is the gain map. In the gain correction step, the offset-corrected x-ray exposure is divided by the gain map. Finally, defective pixels in the image are removed by interpolating their values from neighboring good pixels. Ideally this three-step procedure compensates for any fixed pattern noise introduced by the detector. In portable detectors additional offset corrections may be necessary, such as those described in U.S. Pat. No. 7,832,928B2 "Dark correction for digital X-ray detector" by K. Topfer, R. T. Scott and J. W. Dehority.

Figure 3:
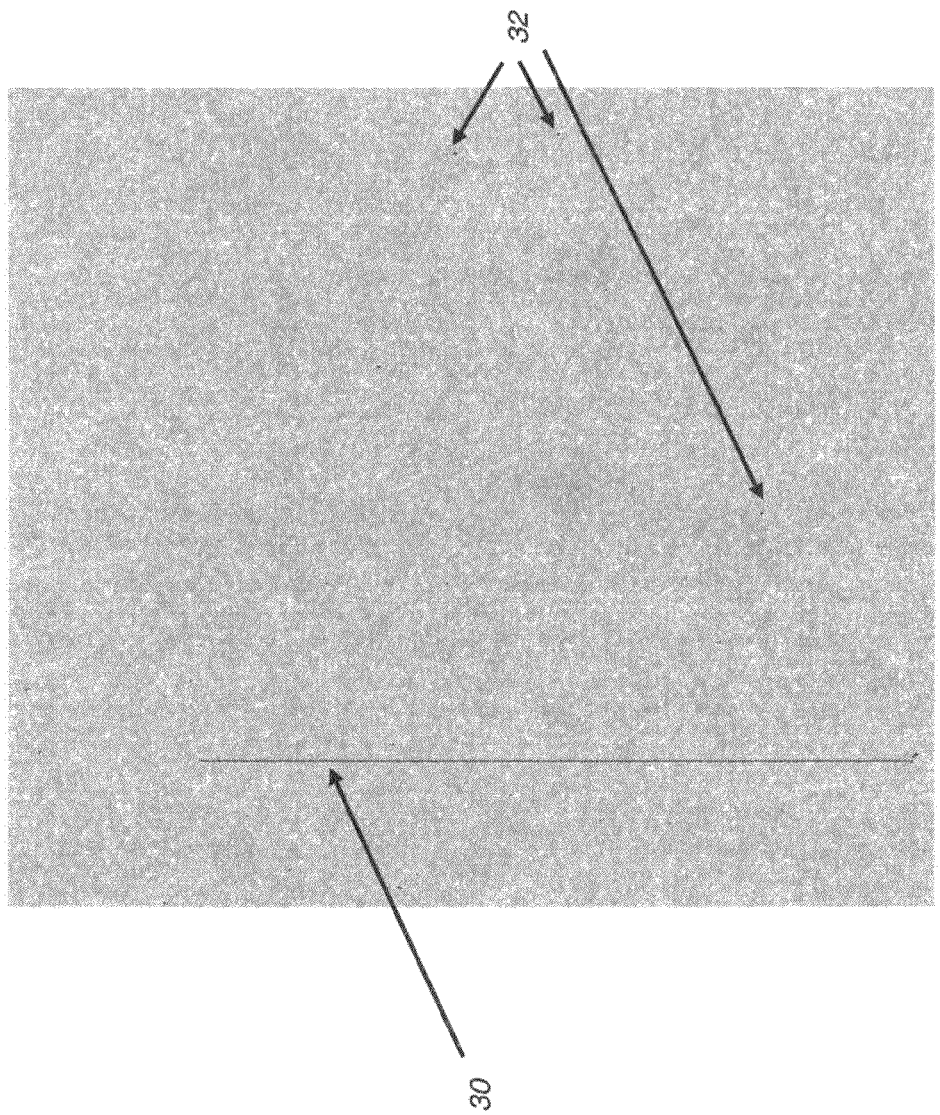
FIG. 3 is a plan view that shows a portion of a radiographic clinical image.

FIG. 3 is a plan view that shows a portion of an x-ray flat field image corrected with an original defect map (e.g., factory). As shown in FIG. 3, a defective line segment 310 and darks clusters including dark areas 320 are visible in the image. In FIG. 3, the flat field portion is an exemplary 600× 700 pixel crop, at 1× magnification.

Figure 4:
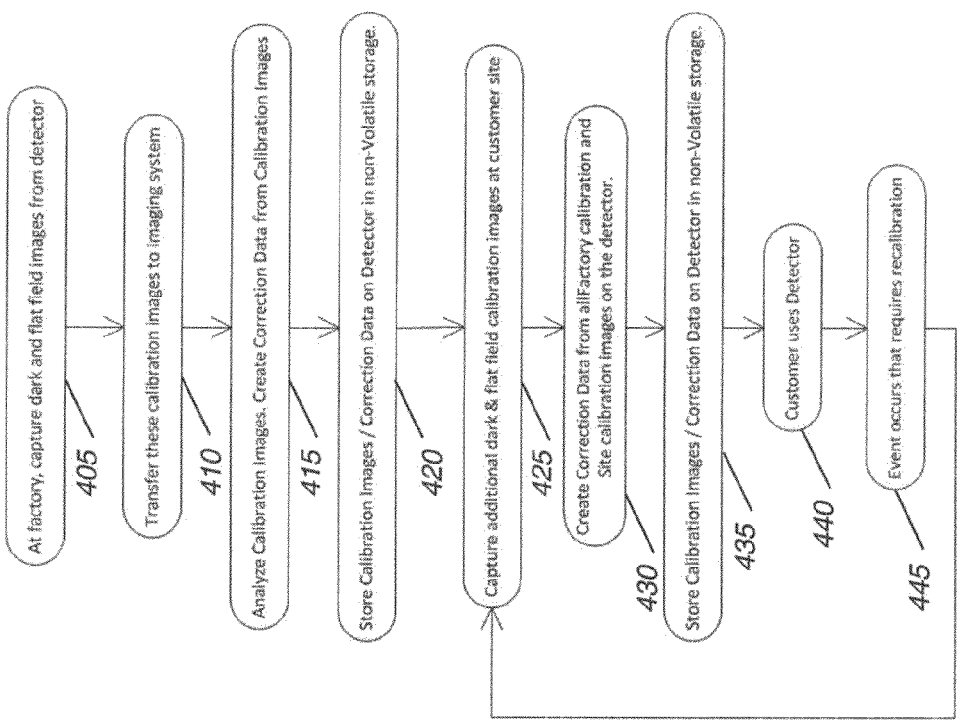
FIG. 4 is a logic flow diagram that shows a method embodiment for calibrating a digital radiographic detector.

A method embodiment for calibrating a new portable detector will now be described. As shown in FIG. 4, first detector calibration can be calibration procedures performed initially or factory calibrations. Factory calibration can include acquiring a large number of images (e.g., dark and flat field) with different exposure and operating characteristics of the detector (e.g., internal operating cycles of the detector, such as voltages and timing, integration times, frame rates, exposure levels, temperature) and/or exposure intervals and then saving and/or processing (e.g., averaging, combining, statistical analysis, frequency filtering, thresholding) the captured images to produce a new set of images that represents the calibration maps (e.g., images). Certain exemplary embodiments can modify and/or combine the captured images or the set of calibration images so that less calibration data needs to be maintained, for example, stored by the detector.

For example, taking one dark image at the detector can obtain a rough approximation of pixel offset for the detector. However, taking and averaging 100 dark images (or any other integer number greater than one) can obtain a better and less noisy approximation of pixel offset for the detector. In this example, all 100 dark images may not need to be saved, but only a single averaged image can be saved.

As shown in FIG. 4, calibration data is captured at the factory (or field site) from a radiographic detector (operation block 405). Processor logic to average 100 images can be done by the detector itself. Alternatively, averaging could be done as additional exposure characteristic data images are acquired to reduce processing time and/or memory use. Alternatively, all of the images could be transferred to an external processor such as at portable computer (PC) or imaging system console, which would perform all the logic and then store or transfer the calibration data (e.g., a single or smaller set of averaged or combined calibration images) back to the detector (operation block 410). In one embodiment, this calibration data (e.g., operation block 405, 415, 420) can be permanently saved for safe keeping at a remote site (e.g., manufacturer site or networked site) in case there is a memory failure of the detector in the field (e.g., removable medium or memory storing this information).

Optionally, calibration forming data (e.g., dark and/or flat field images) can be transferred from the detector to a PC, under the assumption that a PC is being used to do factory calibration analysis (operation block 410). As shown in FIG. 4, the calibration maps, e.g., gain, offset and defect maps, can be created from the captured calibration images at the detector (operation block 415). Exemplary calibration map generation is known to one of ordinary skill in the art of medical radiographic imaging. Then, the calibration maps (e.g., images) can be stored, for example in non-volatile memory, and preferably at the detector. In one embodiment, when the calibration maps (or a portion thereof) are not generated at the detector, the calibration correction data can be transmitted back to the detector (operation block 420). Certain exemplary embodiments can perform all factory calibration logic at the detector, which can eliminate operation blocks 410 and 420.

Detector calibration can also be performed periodically or repeatedly after an initial calibration (e.g., factory calibration). For example, subsequent detector calibration can be performed at a remote or customer site. Operation blocks 425 to 445 can be performed at the remote site.

As shown in FIG. 4, additional calibration images (e.g., dark and/or flat field calibration images) can be acquired (operation block 425). In operation block 425, additional processing/logic can be performed on the calibration data to reduce time needed to acquire images. In operation block 425, additional detector calibration can be calibration procedures performed subsequently and can include acquiring a number of additional images (e.g., dark and flat field) with different exposure or operating characteristics of the detector (e.g., internal operating cycles of the detector, such as voltages and timing, integration times, frame rates, exposure levels, temperature) and/or exposure intervals and then saving and/or processing (e.g., averaging, combining, statistical analysis, frequency filtering, thresholding) the captured images to make a new set of images that represents the updated calibration maps (images).

As shown in FIG. 4, the storage of acquired additional calibration information can be the actual captured images or the output of a logic processing or combining/averaging function, (e.g., that itself can look like another image). The updated calibration images and/or correction data can be stored on the detector (operation block 435) or removable memory. Alternatively, the images can be transferred to a host computer PC, where the calibration processing is done, and then the final calibration information is stored and/or transferred back to the detector for storage (operation blocks 430-435).

Then, the detector can be used for radiographic imaging, preferably at medical facilities or customer locations (operation block 440). Subsequently, an event can occur (e.g., initial registration, time elapsed, number of exposures elapsed, detector dropped, etc.), and processing can indicate that another calibration, performed by the user, is required or can automatically be performed by the detector (operation block 445). Operation blocks 425-445 can be repeated.

Certain exemplary system and/or method embodiments can provide pixelwise computation (e.g., tracking of pixel performance) in a DR x-ray detector in order to monitor a state of calibration of the detector. In one embodiment, trap behavior of non-crystalline semiconductor material can be used without x-ray source emission (e.g., dark images or using a dark operation mode) to identify newly defective pixels. In one embodiment, defective pixels can be identified by taking dark images under different operating conditions of the detector, for example with long and short integration times as a measure of dark current or with long and short pixel readout times to emulate fast and slow operating modes of the detector. Newly identified defective pixels can be combined with known defective pixels in a single defective pixel map. Exemplary system and/or method embodiments herein can provide utilities that can determine defective pixels (e.g., repeatedly, intermittently, aperiodically, manually initiated) without interrupting normal imaging operations. Further, when a total number of defective pixels exceed a prescribed threshold, corrective action can be taken (e.g., pixel recalibration, operator notification, etc.) as previously described in U.S. Pat. No. 6,693,668.

In one embodiment, a calibration mode can be implemented when a portable detector is not in use to identify newly defective pixels. In one embodiment, if a plurality of dark images is being generated for calibration, an interrupt can be performed upon indication of normal imaging operations (e.g., a preparation signal). Alternatively, one method embodiment can perform its monitoring function during normal diagnostic use by analyzing a plurality of calibration mode dark images or a plurality of dark images obtained before and/or after normal imaging operations (e.g., an exemplary patient examination image). Using methods that distinguish pixel-related problems, embodiments herein can provide improved monitoring of an overall calibration state of a portable digital x-ray detector.

Figure 5:
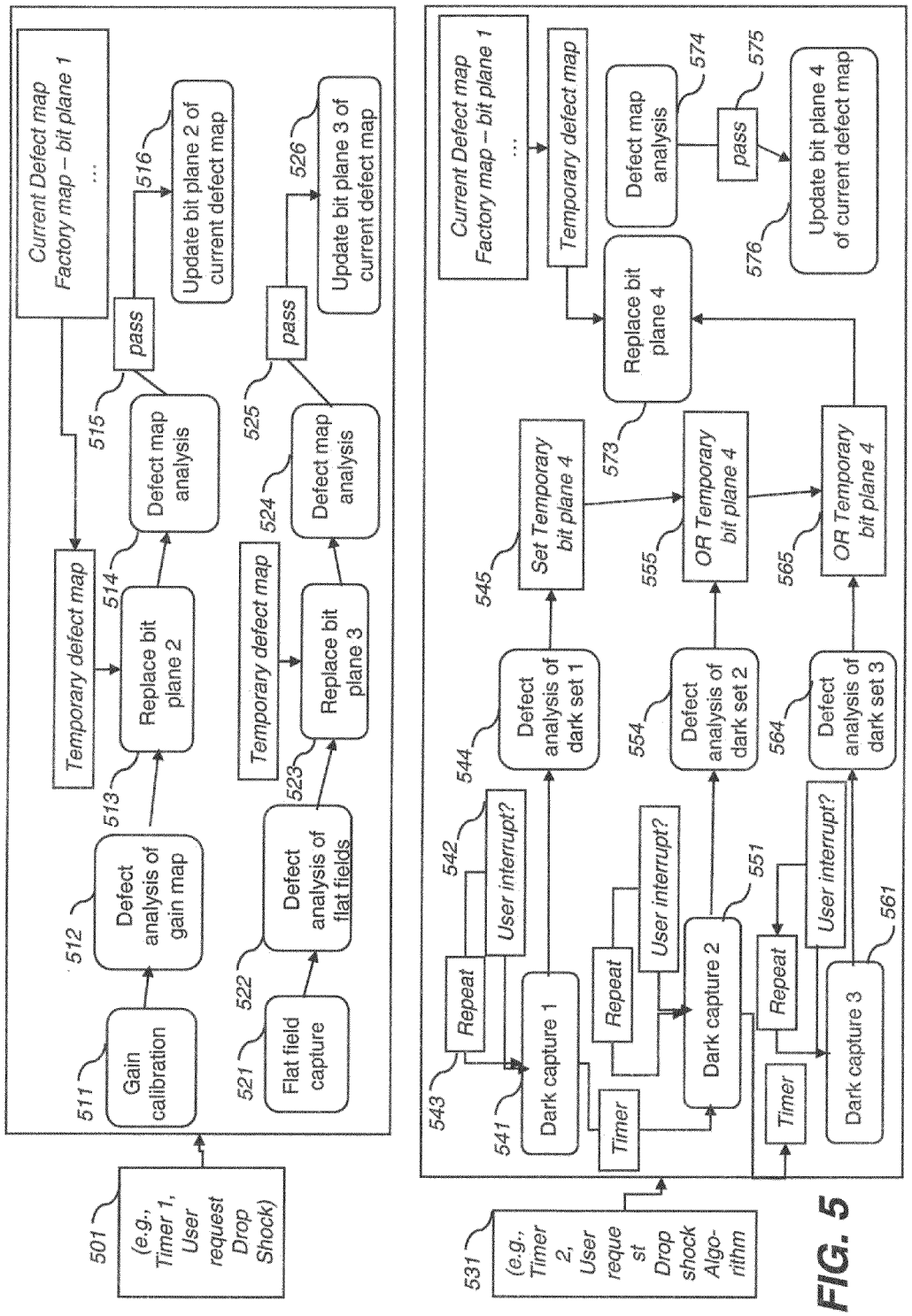
FIG. 5 is a logic flow diagram that shows an exemplary method embodiment for field calibration for a digital radiographic detector.

FIG. 5 is a diagram that shows an exemplary method embodiment for field calibration. In one embodiment, operations in FIG. 5 can implement operations shown in operation blocks 425-445. The sequence of events shown in FIG. 5 can maintain good clinical image quality, e.g., radiographic images without uncorrected defects, while improving or optimizing the workflow for portable radiographic detectors. In order to conserve portable detectors battery power, the imaging array, e.g., see FIG. 2B, can be powered off when the detector does not acquire images. However, some of the support functions, for example, some elements of the power regulation unit 78, the wireless interface 72 and the system sequencing and control unit 70 can be enabled or remain powered on. Such portable detector operations can provide challenges for obtaining good image corrections immediately after powerup, but also can provide opportunities for identifying defects without operator intervention compared with permanent installations, which are always powered on. Another benefit provided by certain embodiments herein is calibration operations that require no operator intervention can be performed more frequently. Other calibration operations, which require the operator to take x-ray exposures, can be performed less frequently, (e.g. operation block 425), but can be more capable in identifying all types of additional defects. To facilitate radiographic imaging system maintenance, failure analysis by service personnel, and to reduce or prevent the system from ever using faulty images to update defect maps, the result of each defect update operation can be stored (e.g., in a specific bitplane of the defect map) and the next update operation can refresh the defect map completely (e.g., multiple bitplanes). For example, the results of the factory defect identification (e.g., operation blocks 405 to 420) can be stored in bit plane 1 of the defect map, the results of operation block 425, which is performed infrequently, e.g., yearly, can be stored in bitplane 2, and defect updates identified from daily or weekly dark captures can be stored in bitplane 3. In one embodiment, a defect map with 8 bits per pixel could potentially store 8 different types of pixel defects. During defect correction of the radiographic image, a logic operation (e.g., an OR operation) can be applied to combine the results from all bitplanes. For better efficiency, the OR operation could be applied immediately after each update, and the locations of all defective pixels are stored as a memory access list relative to the zero position in the image.

Method embodiments shown in FIG. 5 can use the following exemplary sequence of events for periodic updates of the defect map. A gain calibration (operation block 511) can be triggered (operation block 501) based on a timer, a detector event, e.g., drop shock, a user request or an image analysis algorithm (e.g., an algorithm which examines the fully corrected radiographic images for additional defects and triggers a new calibration when the maximum allowed number of uncorrected defects is reached, e.g., see US Patent Publication 2011-0057802). The resulting gain map can be examined using statistical analysis to identify defects, for example as described in ASTM Standard E2597 (operation block 512). A temporary defect map is generated from the current defect map and bit plane 2 can be replaced with the new defect map obtained from the gain map (operation block 513). All bit planes of the temporary defect map can be combined in an OR operation for defect map analysis, which can determines whether certain criteria for the defect map are met, for example with respect to the total number of defects, number of defective rows and columns, maximum defect cluster size and other criteria (operation block 514). If the new defect map passes all or selected criteria (operation block 515), the existing defect map can be replaced with the temporary map (operation block 516). If the new defect map fails one or more criteria, no replacement occurs and/or the user can receive a warning, e.g., see U.S. Pat. No. 6,693,668.

As a next optional operation, the user can take flat field images at different exposure levels (operation block 521), which are fully gain-offset- and defect-corrected with the existing defect map. The images can then be examined for uncorrected defects using statistical analysis (operation block 522) and a new temporary defect map can be generated from the existing defect map, where bit plane 3 can be replaced with the newly identified defects (operation block 523). Defect map analysis and disposition are performed (operation blocks 524, 525, 526) as described above for bit plane 2. In one embodiment, at the end of these operations, the timer for gain calibration (operation block 501) can be reset and all calibration triggers are cleared.

The second calibration event (operation block 531), dark calibration, can be on a second timer, and can be performed more frequently than gain calibration without user intervention or disruption of the normal clinical workflow. The event can again be triggered by a timer, detector event, e.g., drop shock, a user request or an image monitoring algorithm. The event can include at least one set of dark captures (operation block 541), but two to four different dark acquisition sequences may be used to find all types of new defects. Examples of exemplary suitable sets of dark captures are described farther below. In one embodiment, after the dark calibration event was triggered (operation block 531), the system sequencing and control 70 can check that the detector is idle and initiate the first set of dark captures (operation block 541). If the user interrupts the sequence to take radiographic images (operation block 542), the detector can be returned to its regular operating state and the calibration step is aborted. After some specified times elapsed, the detector tries again to execute the calibration (operation block 543). At the end of the image capture, statistical analysis is performed on the captured images to identify defects (operation block 544). The results can be added to temporary defect map (operation block 545). Additional sets of dark images (operation blocks 551, 561) can be acquired immediately after the first operation finishes (operation block 531) or after another timer expired. With the second option, the user can take radiographic images between the calibrations (operation block 541, 551, 561). Dark capture (operation blocks 551, 561) and defect identification (operation blocks 554, 564) and the new temporary defect map can now be the result of at least one OR operation of the defect location from multiple dark captures (operation blocks 555, 565). The second calibration event can be repeated for several more sets of dark image captures. FIG. 5 shows an example with three different sets of dark captures. After all sets of dark captures are complete, a temporary defect map is generated from the current defect map and bit plane 4 can be replaced with the new defect map obtained from the dark captures (operation block 573). All bit planes of the temporary defect map can be combined in an OR operation for defect map analysis (operation block 574) and the disposition of the new defect map can be performed (operation blocks 575, 576) as described above for gain defects.

Figure 6:
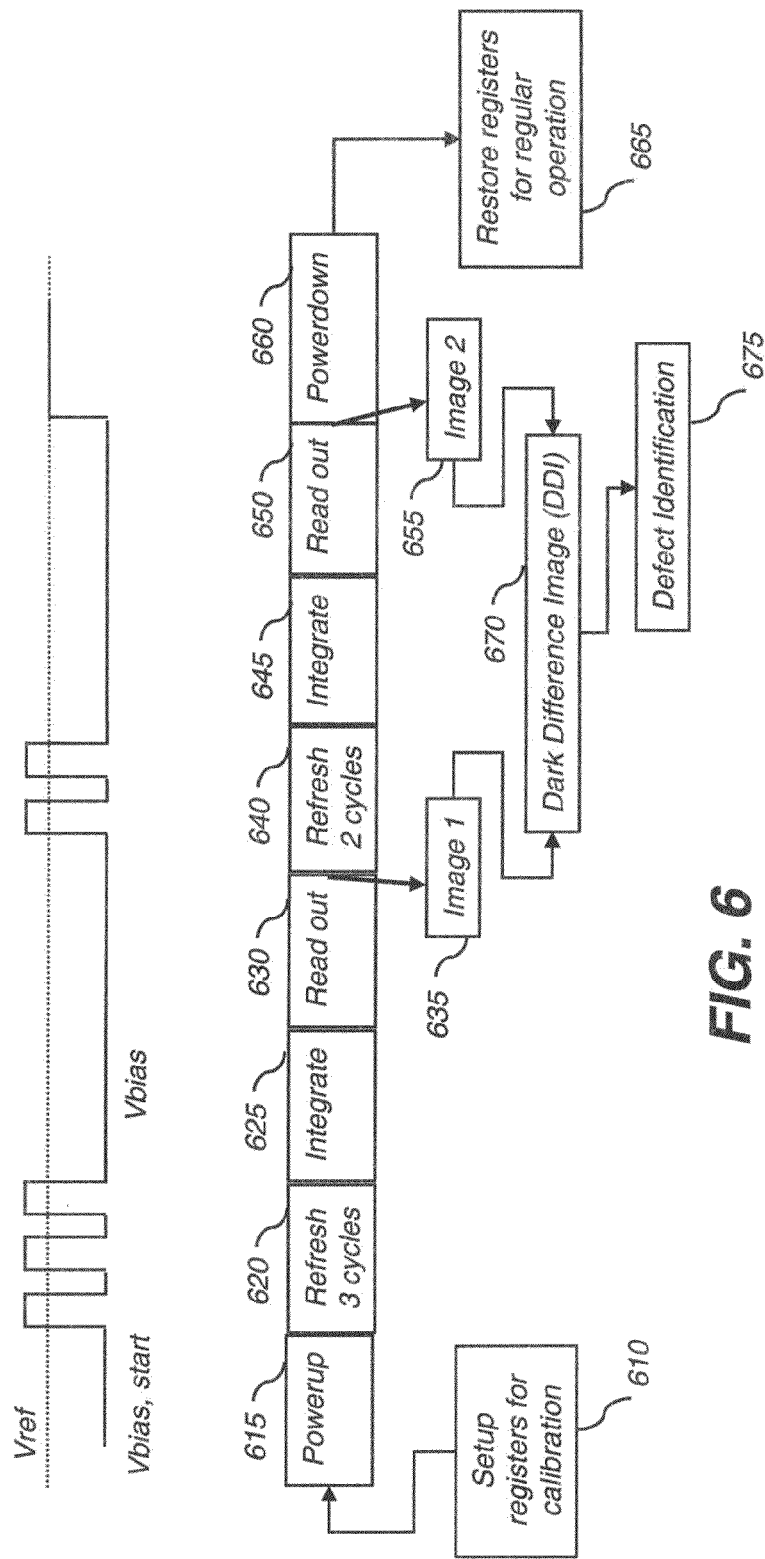
FIG. 6 is a logic flow diagram that shows another exemplary method embodiment for defect identification from dark calibration images for a digital radiographic detector.
Figure 7:
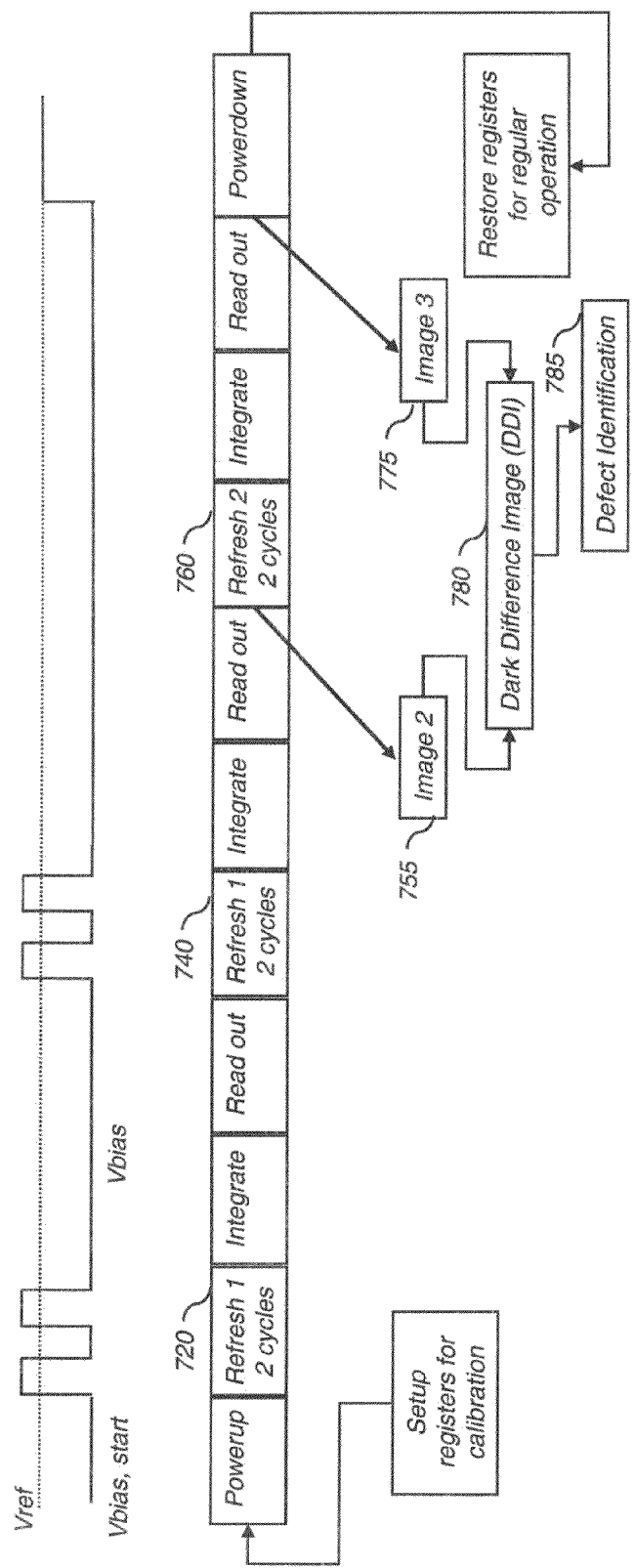
FIG. 7 is a logic flow diagram that shows another exemplary method of defect identification for calibration for a digital radiographic detector.
Figure 8:
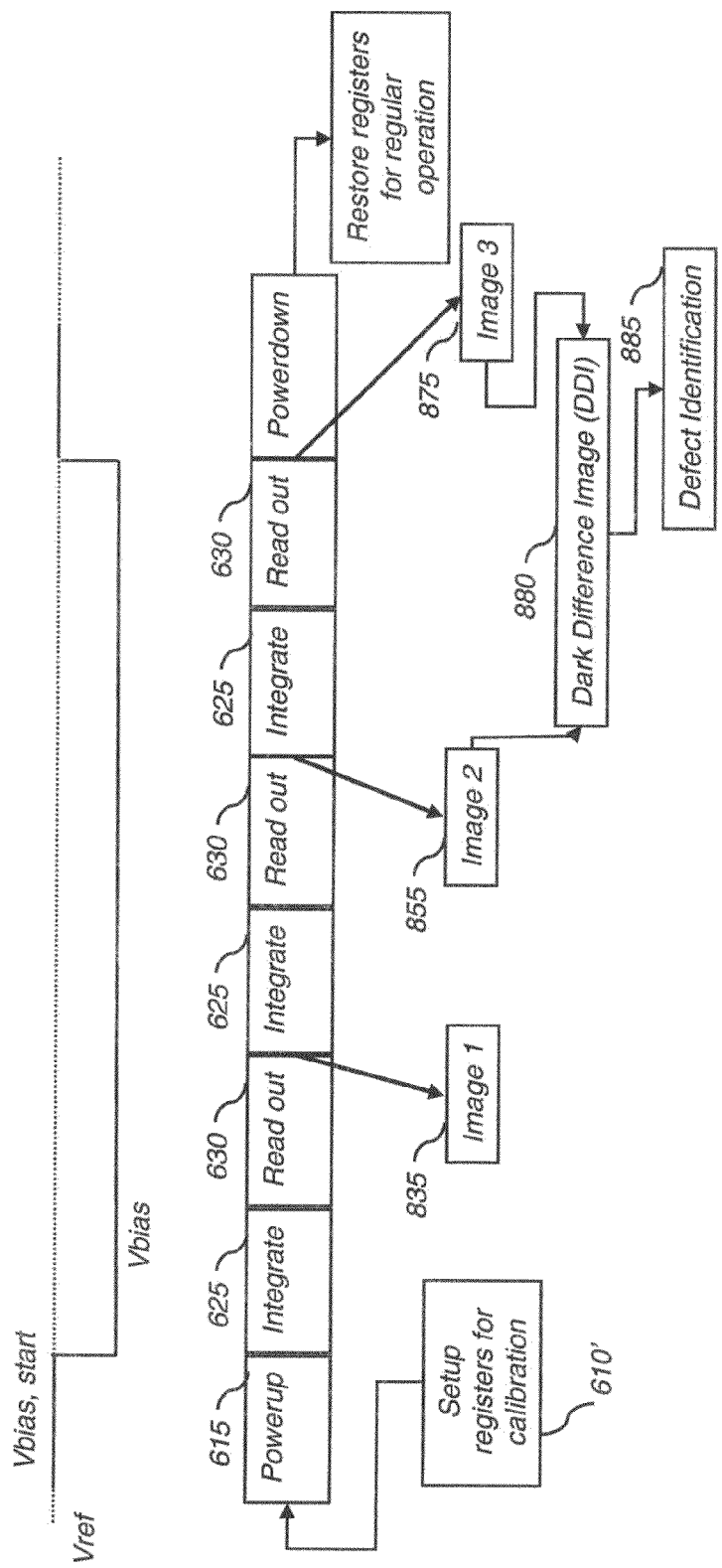
FIG. 8 is a logic flow diagram that shows yet another exemplary method embodiment for defect identification from dark calibration images for a digital radiographic detector.

Certain exemplary embodiments described herein in FIGS. 6-8 can use the charge trapping behavior of amorphous silicon to identify defective pixels in an imaging array of a digital radiographic detector. Such exemplary method embodiments for defect identification for a digital radiographic detector can be implemented using embodiments of apparatus shown in FIGS. 1-2; however, methods of FIGS. 6-8 are not intended to be limited thereby.

One contribution of the dark current can be due to the carrier emissions from the electronic states within the bandgap of the disordered solid such as amorphous silicon. In steady-state equilibrium, the average number of carrier emissions is fairly constant through time, which manifests itself as a constant dark current level. When the bias across the photosensor is changed, the equilibrium state of the photosensor is perturbed. The probability of carrier occupation of the electronic states within the bandgap can also be changed. This prompts a change in the number of carriers emitted and is manifested as transient current. Since the number of emitted carriers is related to the electronic state distribution within the bandgap, depending on the quality of the material (e.g. how defective the material is compared to single crystal silicon), the behavior of the transient current can be indicative of the quality of the photosensor and consequently the pixel. This information can then be used to identify defective pixels (e.g., autonomously).

In one embodiment, differences in dark images can be induced by powering up a digital radiographic detector, which leaves charge trapped in the defect states within the bandgap. Different amounts of charge get released while the detector is taking the first few images after powerup before the trap occupancy reaches an equilibrium. In clinical settings, the imaging array of a portable DR detector is usually turned off or powered down between patient exposures to conserve battery power. Further, the time between exposures can be, for example, as short as 15 seconds or as long as several days. Thus, exemplary method embodiments of FIGS. 6-8 can be well suited for operating sequences of such portable DR detectors.

As shown in FIGS. 6-8, the imaging array of the detector can be powered up and a plurality (e.g., 3 or more) of dark images are captured. The bias voltage of the photosensor, Vbias=Vcathode−Vreference (e.g., see FIG. 2B), can be controlled during powerup of the imaging array, while the power supplies to the photosensor and the readout TFTs are switched on, such that the trap occupancy at the start of the imaging cycle can be repeatable regardless of how long the imaging array was powered off since the last capture. An initial state of Vbias is indicated in FIGS. 6-8. To achieve low lag in imaging and predictable behavior immediately after the imaging array is powered on, the detector can perform one or more refresh cycles before each image capture (e.g., image capture can include dark and exposed images). In one embodiment, the refresh cycle manages the occupancy of the traps by alternating an operation that fills the traps and an operation that empties the traps. During the fill period, Vreset and/or Vbias can be controlled to produce a net photosensor bias Vbias=Vcathode−Vreference=Vfill that can be either forward biased or less reverse biased (e.g., than a photosensor bias during exposure) to fill a significant fraction of traps in the photosensor. During the spill period, Vreset and/or Vbias can be controlled (e.g., switched) to return the photosensors to the spill voltage Vspill. During the Vspill period, a large fraction of the traps emit charge and the charge can be removed through both terminals of a photosensor (e.g., an anode and a cathode of the photodiodes). For certain exemplary fill and spill cycles, the net trap occupancy of the photosensors after one or more fill and spill cycle can be independent of the initial state of the photosensors. During each setting of Vbias (fill or spill), the row select voltage of each gate line can be switched once to establish a conducting state in the row select TFT. This serial addressing continues for all the gate lines in the array. However, in alternative embodiments all gate lines can be switched on at once during the reset operation and in other embodiments several gate lines can be switched on at the same time to perform a scrolling reset of blocks of gate lines through the imaging array. In one embodiment, total time used for a single fill and spill cycle can be in the range of 10 ms to 500 ms.

Exemplary Vbias settings during the refresh cycle are shown in FIGS. 6-8. After finishing the refresh cycle(s), the panel can integrate charge in the photo sensor (e.g., dark or exposed) and a TFT read-out of the charge can occur. FIGS. 6-8 show exemplary image capture cycles with two or three individual image captures. After the final capture, the imaging array can be powered down, e.g., all supply voltages are switched off in a controlled fashion. Embodiments with two or three images can correspond to capturing an exposure with one or two post-dark images for offset correction. However, any number of dark images larger than one is suitable for the identification of new defects. Further, the refresh cycle can be implemented using different methods, e.g., refresh with an illumination, a backlight or a fill and spill cycle followed by a short integration and readout.

FIG. 6 is a logic flow diagram that shows another exemplary method embodiment for defect identification from dark calibration images for a digital radiographic detector. As shown in FIG. 6, the imaging array of the detector is powered down, but the processor, e.g., FPGA, for system sequencing and control can be active. The detector receives a signal (e.g., operation block 531, FIG. 5) to start a dark calibration. In one embodiment, operations of the imaging array can be controlled using a set of registers. The processor can temporarily change the registers to achieve special modes of detector operation including operating modes useful for identifying defects (e.g., calibration mode, step operation block 610). These special sets of register settings can be stored on non-volatile memory on the detector or be downloaded from a host computer on initiation of the calibration. After the calibration operation is finished, the processor can re-store the registers for normal operation (operation block 665).

While the imaging array is powered up (operation block 615), Vbias can be set at the same level as for normal operations (Vbias Start). Then N refresh cycles can be performed (operation block 620) before taking a first dark image (operation block 635) (e.g., integration (operation block 625) and readout (operation block 630). Then, M refresh cycles can be performed (operation block 640) before taking a second dark image (operation block 655) (e.g., integration (operation block 645) and readout (operation block 650). As described herein, N and M can be any positive integers, and M can be equal to N. FIG. 6 shows N=3 and M=2. Optionally, the cycle can be repeated for additional dark images such as a third dark image (not shown in FIG. 6). Then, the imaging array of the radiographic detector can be powered down (operation block 660) and the processor restores the register settings such as for normal operations (operation block 665).

A dark difference image I can then be determined (operation block 670). The dark difference image (DDI) I can be determined by the difference between the first dark image and the second dark image (or the average of dark images 2 and 3, etc.). This dark image can be subjected to defect identification (operation block 675) (e.g., see FIGS. 9A-9B). It should be noted that different instances of this sequence can be run at different timing or with different integration periods (e.g., see FIG. 10A) and that the images captured could be used for other calibration purposes, for example offset adjustments for exposures as described in US7832928B2. Those skilled in the art will recognize that dark difference images captured in this manner during continuous operation of the detector (e.g., a sufficiently long time after power-up) would reveal few additional defects. However, the inventors determined when exemplary embodiments include powerup, defect identification is effective.

FIG. 7 is a logic flow diagram that shows yet another exemplary method embodiment for defect identification from dark calibration images for a digital radiographic detector. As shown in FIG. 7, even more new defects can be identified when the mode of operation is changed significantly for at least one of the dark image captures. For the first two dark images for the embodiment in FIG. 7, operations and Vbias settings match those shown in FIG. 6 except that two refresh cycles are performed (operation blocks 720, 740) before both the first dark capture and the second dark capture. For the third dark capture, however, both fill cycles are replaced by another spill cycle (operation block 760), e.g., Vbias can be kept at the regular operating point during the entire refresh operation. The different refresh operation can change the trap emission during the third dark capture significantly, such that the difference between dark image 2 (operation block 755) and dark image 3 (operation block 775) that generates the dark difference image DDI (operation block 780) is quite large. Then, the imaging array of the radiographic detector can be powered down and the processor restores the register settings such as for normal operations as described for FIG. 6. Test data show the embodiment of FIG. 7 mode of operations can be as effective at identifying new defects (operation block 785) as an analysis of the gain map for new defects following a gain calibration (operation block 512, FIG. 5).

FIG. 8 is a logic flow diagram that shows another exemplary method embodiment for defect identification from dark calibration images for a digital radiographic detector. As shown in FIG. 8, dark signal differences induced by charge injection at power up can be used to determine defective pixels. Calibration initiation (operation block 610') and power-up of the imaging array (operation block 615) can occur as shown in FIG. 6. However, in operation block 610', the register settings on the digital board can be changed such that the detector runs without a refresh mode (e.g., no refresh cycles) and that the bias voltage at powerup (e.g., represents photodiode bias (e.g., 0 volts)) can inject charge into the photodiode at powerup. Then three dark images can be captured (operation blocks 835, 855, 875) including integration (operation block 625) and readout (operation block 630). In this scenario, significant amounts of trap charge can be integrated during each dark capture. However, the trap charge emission follows a stretched exponential decay function, such that large differences between the dark images can be observed. In fact, the photosensor usually gets saturated during the first dark capture such that images 2 and 3 can be preferably used for analysis of defects. After power down (operation block 660), the processor can restore the register settings such as for normal operations (operation block 665). The dark difference image, DDI, is calculated using the difference between the second dark image and the third dark image after powerup (operation block 880). Test data show the embodiment of FIG. 8 can be as effective at identifying new defects (operation block 885) as the analysis of the gain map after gain calibration.

Figure 9A:
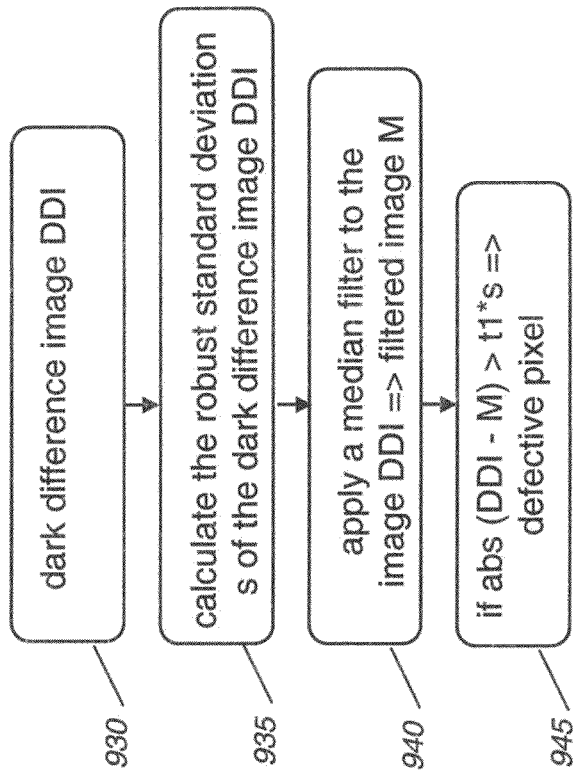
FIG. 9A and FIG. 9B are logic flow diagrams that show exemplary embodiments of the defect identification operations for a digital radiographic detector.
Figure 9B:
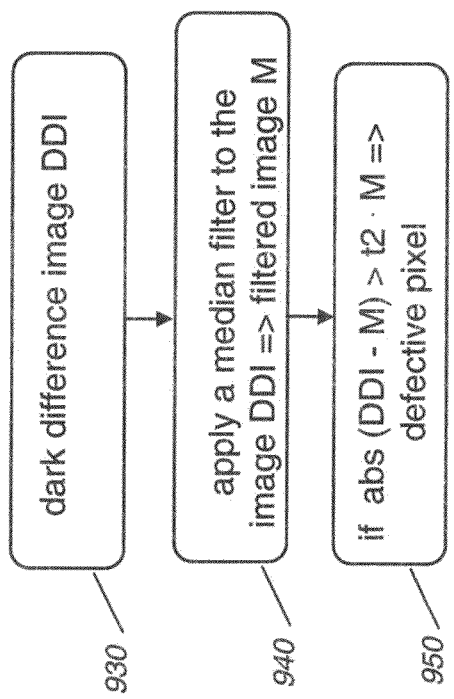

FIG. 9A and FIG. 9B show exemplary embodiments of the defect identification operations for a digital radiographic detector. Both method embodiments can identify pixels that differ from surrounding pixels in some characteristic. However, other methods known in the art can be employed for this operation, for example simple threshholding of dark images with allowed lower (e.g., minimum) and upper (e.g., maximum) values. As shown in FIG. 9A, a process can start by obtaining a dark difference image DDI (operation block 930). Next, a robust standard deviation, s, of the dark difference image DDI can be calculated (operation block 935) using methods of robust statistics known in the art, such as trimmed estimators that exclude some percentile of the highest and lowest pixel values. In one exemplary embodiment, the robust standard deviation, can be determined by dividing the DDI into X by X or 16×16 pixel tiles or groups (e.g., X can be a number other than 16) and calculating the standard deviation of each of the tiles. The robust standard deviation s of the DDI is equal to the median of the standard deviations of the individual tiles. Then, a median-filtered image M can be determined from the DDI (operation block 940), for example, by applying a Y by Y or 9×9 median filter (e.g., Y can be a different size or not a square) to the dark difference image. Then, defective pixels can be determined at each pixel location j,k: when abs (Ij,k−Mj,k)>threshold t1=10*s, the pixel can be marked as defective (operation block 945). However, the threshold t1 can be different from 10. Alternatively, simple differences between the pixel value and the median can be used instead of the absolute value to find pixels that either differ by more than the threshold standard deviation, or those that fall below the standard deviation threshold.

In the embodiment shown in FIG. 9B, after a dark difference image DDI is obtained (operation block 930), a median filter can be applied to the DDI to generate the median-filtered image M (operation block 940), and a pixel is marked as defective when abs (Ij,k−Mj,k)>threshold t2=0.2 Mj,k, e.g., when the pixel value deviates from the median by more than a fraction t2>0 of the median (operation block 950). Further, the threshold t2 can be different from 0.2. Again simple differences between the pixel value and the median can be used instead of the absolute value to find pixels that either differ by more than the threshold fraction t2 of the median, or those that fall below the fraction threshold t2 of the median. As shown in FIGS. 9A-9B, a median filter and/or robust standard deviation can include or exclude the center pixel thereof.

Figure 10A:
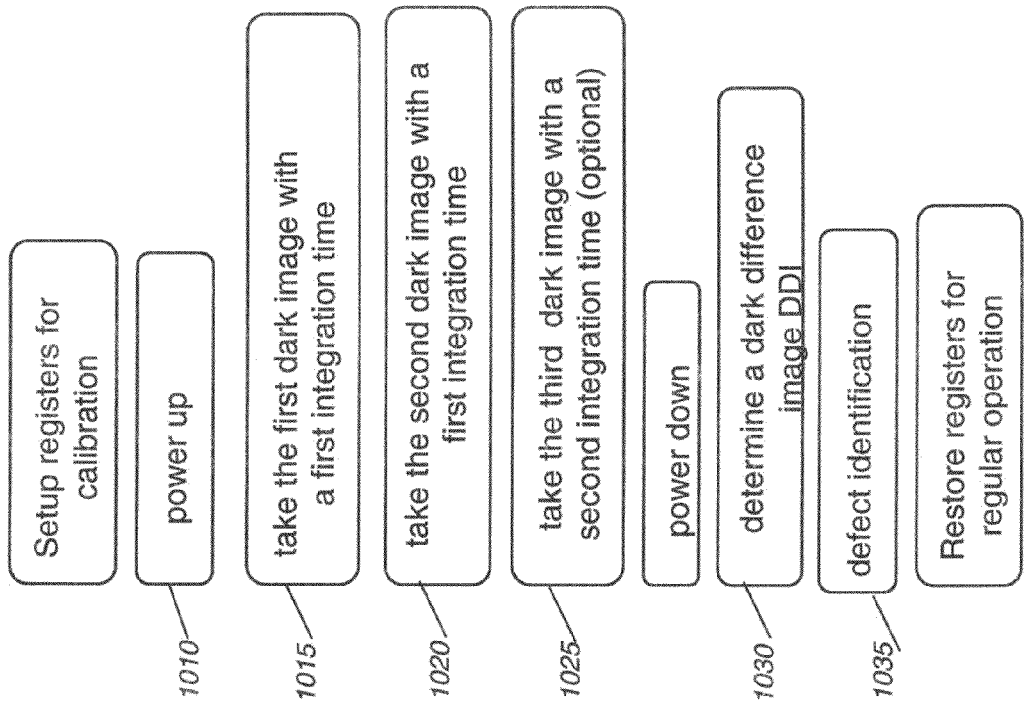
FIGS. 10A and 10B are logic flow diagrams that show exemplary method embodiments for defect identification for calibration of a digital radiographic detector.
Figure 10B:
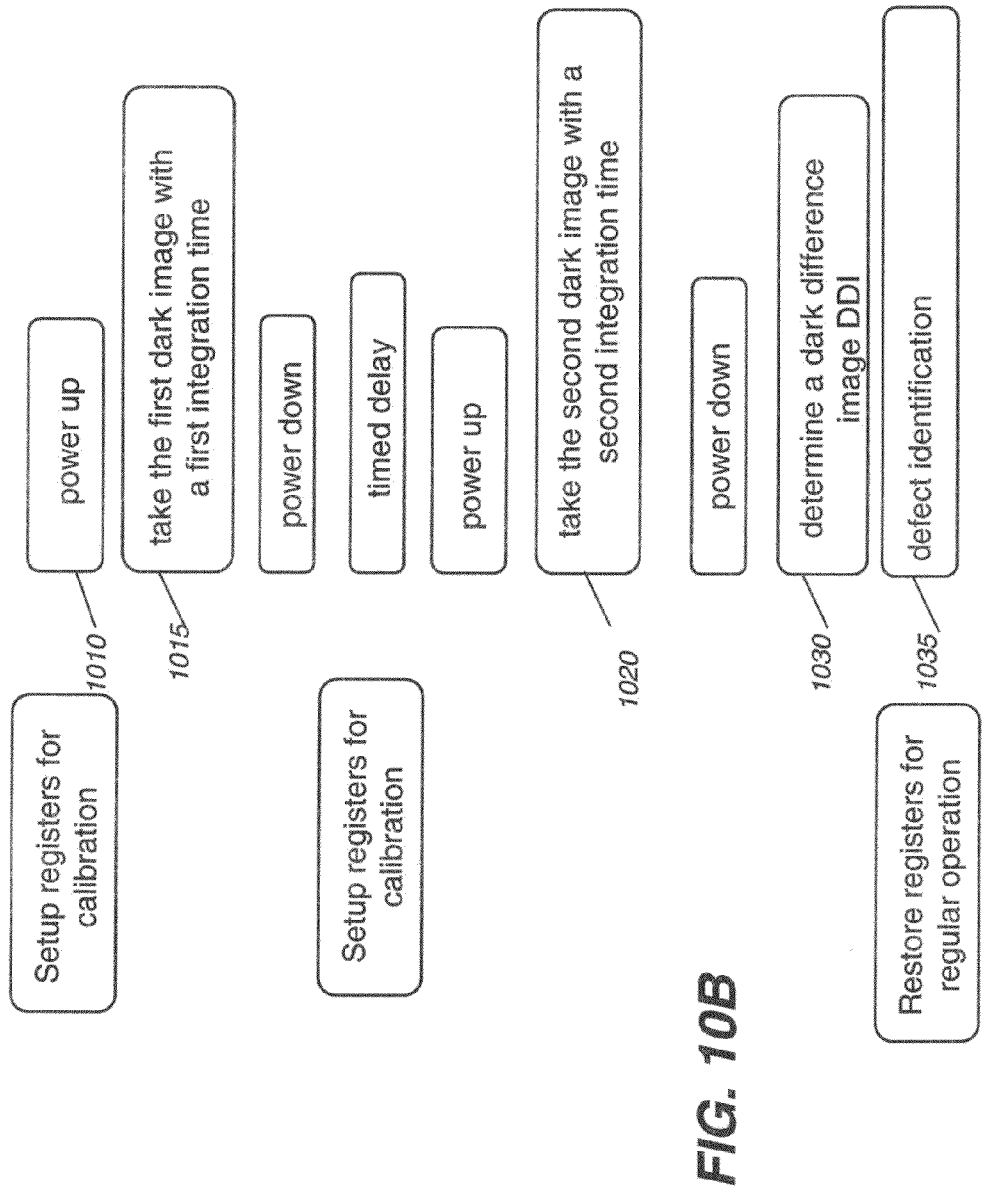

FIGS. 10A and 10B are flow charts that show exemplary method embodiments for defect identification for calibration of a digital radiographic detector. These method embodiments for defect identification for a digital radiographic detector can be implemented using embodiments of apparatus shown in FIGS. 1-2; however, methods of FIGS. 10A-10B are not intended to be limited thereby.

Certain exemplary embodiments described herein can use the differences in dark current to identify defective pixels in an imaging array of a digital radiographic detector. Initiation of the dark calibration and powerup of the imaging array shown in FIG. 10A can be similar to FIG. 6. A sequence of operations of the detector including refresh cycles, integration and read-out can also be similar to FIG. 6. After the detector is powered up (operation block 1010), a plurality (e.g., 2, 3, 5, 7, 40, etc.) of dark images are captured with varying integration times among the captured dark images to be compared (e.g., to detect dark current differences that are indicative of defective pixels). According to FIG. 10A, a first dark image (operation block 1015) and then a second dark image can be taken at a first integration time (operation block 1020). Then, a third dark image with the second integration time can then be taken (operation block 1025) and a dark difference image DDI is calculated between the second and third dark image. Power-down operations, determination of the dark difference image DDI (operation block 1030) and/or defect identification (operation block 1035) can be similar to FIG. 6.

Alternatively, as shown in FIG. 10B, in one embodiment, pixels having abnormal dark current can be identified as follows. For example, the dark difference image DDI can be the difference between first dark images after power-up of the detector (e.g., including N refresh cycles) for the first (long integration) and second (short integration) integration times. As shown in FIG. 10B, after the detector is powered up (operation block 1010), a first dark image can be taken at a first integration time (operation block 1015), and the detector can be powered down. Again (e.g., after a preset delay, or period without use), the detector can be powered up, a second dark image can be taken at a second integration time (operation block 1020) and a dark difference image DDI is calculated between the first and second dark image. Power-down operations, determination of the dark difference image DDI (operation block 1030) and/or defect identification (operation block 1035) can be similar to FIG. 6.

Figure 11:
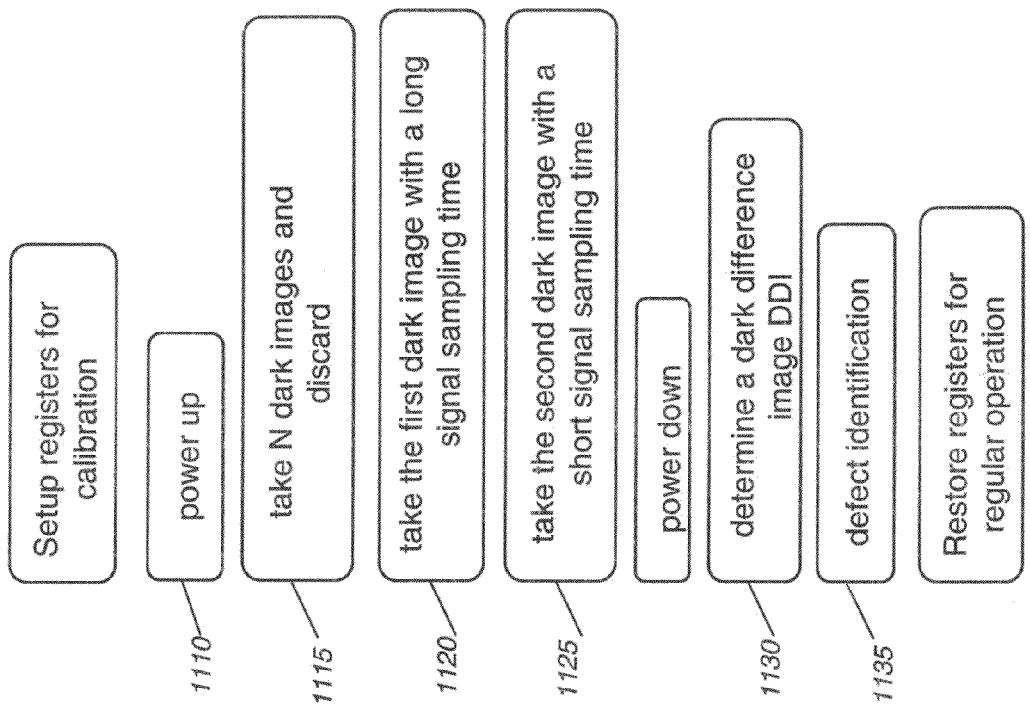
FIG. 11 is a logic flow diagram that shows another exemplary method embodiment for defect identification for calibration of a digital radiographic detector.

FIG. 11 is a flow chart that shows another exemplary method embodiment for defect identification for calibration of a digital radiographic detector. The embodiment of FIG. 11 can be used when the detector supports, in addition to regular projection radiography with slower image capture rates, applications that require fast acquisition of large numbers of images, e.g., tomosynthesis, cone beam CT and/or fluoroscopy. For such fast acquisition applications, the portable detector would be tethered and operate in a continuous mode. FIG. 11 shows an exemplary dark calibration for defect identification in such modes. The registers for calibration are set up and the detector can be powered up (operation block 1110). Then N (N is an integer greater than 1) dark images can be taken and discarded to get the detector into a stable operating mode (operation block 1115). For practical reasons, to keep the calibration time to a minimum, N can preferably be below 100. Exemplary image capture cycles for such fast operations can at least include read-out (operation 630 in FIG. 6) as for fluoroscopy; image capture cycles can additionally include integration (operation 625 in FIG. 6) or the full sequence as shown in FIG. 6 with refresh, integration and readout. Then, a first dark image can be taken with a long TFT ON time during read-out (operation block 1120) e.g., 6 times the TFT response time, and a second dark image can be taken with a short TFT ON time during read-out (operation block 1125), e.g., 1 time the TFT response time. Both times can vary (operation block 1120, 1125) and various method embodiments work as long as the TFT on times are different in both cases. Power-down operations, determination of the dark difference image DDI (operation block 1130) and/or defect identification (operation block 1135) and restoration of the register settings for regular image captures can be similar to FIG. 6.

Figure 12:
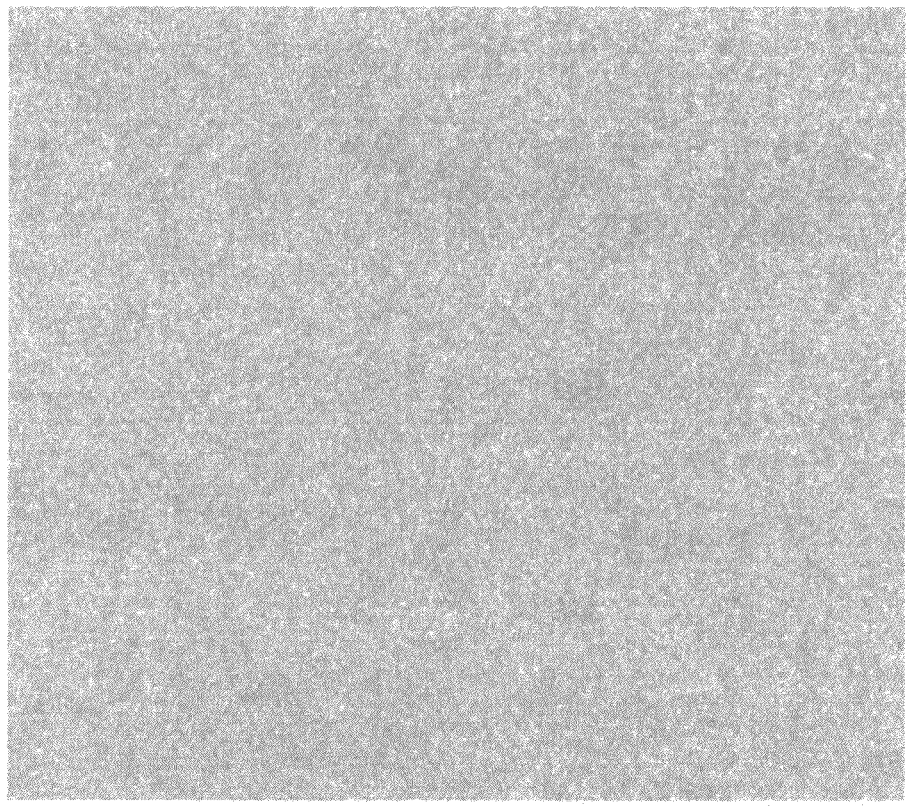
FIG. 12 is a plan view that shows a portion of a radiographic clinical image corrected with a defect map update according to an embodiment.

FIG. 12 is a plan view that shows a portion of a clinical image from FIG. 3 corrected using an embodiment of a defect map update generated from dark image characteristics of pixels (e.g., DDI). As shown in FIG. 12, there are no visible defects.

Certain exemplary embodiments can implement improved or more accurate defect detection for calibration by using various combinations of defect detection methods shown in FIGS. 5-8 and 10A-11, respectively. For example, for improved defect detection, the system 100 can perform one of the methods of FIGS. 5 and 7, and then an embodiment of the method shown in FIG. 8. In each case, an overall defect map update can be formed by logically OR-ing the results (e.g., defect maps) from the different options (e.g., if any of the maps has an entry of 1 at a pixel location, the overall defect map update has an entry of one). In certain exemplary embodiments, such a defect map update can be kept separate from the factory defect map.

Further, as described herein, before or during defect correction, the factory defect map can be combined with (e.g., logic OR) the current defect map update. Further, when defect identification from dark images is run the next time according to embodiments herein, the defect map update is preferably replaced with the new results.

Certain exemplary embodiments herein address and are advantageous for wireless, portable digital x-ray detectors that can be powered off while no images are taken (e.g., to conserve battery power). Further, exemplary embodiments herein can be performed to update defect detection and/or form defect map updates without user intervention, which can provide efficient workflow because these detectors experience more rough handling (e.g., mechanical stress) than permanent installations (e.g., x-ray detectors in a bucky or radiographic table installation) and thus require more frequent calibration. In addition, an algorithm can be used in combination or alone for the detectors to check whether the updated defect map or overall defect map exceeds a pre-determined threshold for number size and concentration of defects making the detector unsuitable for medical diagnostic or industrial use. In such case, the software can optionally disable the detector, display a warning message on the host computer 80 or provide a visible indicator on the detector itself, for example, by changing the color of a light-emitting diode.

Exemplary method/apparatus embodiments herein can be implemented in computer and other control logic processor hardware and supporting storage media that are associated with radiographic system 100. This can include control logic functions that are executed by host computer 80 in cooperation with control logic processor 70 (e.g., see FIG. 1) and, optionally, additional embedded processors, such as microprocessors that are part of DR detector 10. In this context, cooperation between the computer and control logic processor 70 means, for example, that these devices communicate via a wired or wireless protocol. As part of this cooperation, logic control signals can originate at the host as well as at the embedded processors. Some part or all of the computations can be shared, performed on both the host computer and the embedded processors, or may be executed on either of them. Exemplary embodiments may also be embodied in the form of computer program code containing instructions embodied in tangible media, such as various forms of magnetic or optical storage media, hard drives, or any other computer-readable storage medium, where, when the encoded instructions are loaded into and executed by a computer or other logic processor, the computer or other processor becomes an apparatus for practicing exemplary embodiments or implementing method embodiments. Exemplary embodiments can also be embodied in the form of computer program code, for example, whether stored in a storage medium, loaded into and/or executed by a computer or processor, or transmitted over some transmission medium, such as over electrical wiring or cabling, through fiber optics, or via electromagnetic radiation, where, when the computer program code is loaded into and executed by a computer or other type of logic processor, the computer or processor becomes an apparatus for practicing exemplary embodiments or implementing method embodiments. When implemented on a general-purpose computer, processor, or microprocessor, the computer program code segments configure the computer, processor, or microprocessor to create specific logic circuits.

Various thresholds that are described herein can be empirically determined or can be functions of a statistical measure. The calibration and defect metrics can be stored on the on-board control logic processor 70 or on host computer 80, along with various ancillary system data, such as any of a time, system operator, system name, detector serial number, location, temperature, and shock and vibration values. These parameters can be part of the image metadata that can originate from the detector itself, e.g., temperature and shock data or detector ID/serial number, and other data relating to the operation of the panel, or from the host computer. Many of the image metadata stem from interactions of the user with the host computer, e.g., the detector ID when the detector is first registered on the computer, the name or operator ID, the type of examination to be performed, and the exposure technique for the examination. Image metadata can be stored together with the images in a permanent image archive, such as controlled through a networked host, and/or on the host computer itself.

The term "set", as used herein, refers to a non-empty set, as the concept of a collection of elements or members of a set is widely understood in elementary mathematics. The term "subset" as used herein refers to a non-empty subset of a set having one or more members. For a set S, a subset may comprise the complete set S (improper subset) or may have fewer members than the complete set S (proper subset).

In one embodiment, digital radiographic imaging detectors can include thin-film elements such as but not limited to thin-film photosensors and thin-film transistors. Thin film circuits can be fabricated from deposited thin films on insulating substrates as known to one skilled in the art of radiographic imaging. Exemplary thin film circuits can include amorphous-silicon devices such as a-Si PIN diodes, schottky diodes, MIS photocapacitors, and be implemented using amorphous semiconductor materials, polycrystalline semiconductor materials such as silicon, or single-crystal silicon-on-glass (SiOG). Certain exemplary embodiments herein can be applied to digital radiographic imaging arrays where the DR detector is a flat panel detector, a curved detector or a detector including a flexible imaging substrate.

In accordance with one embodiment, a radiographic detector is provided that can include a computer operable during normal diagnostic use of the detector for accessing a digital image including digital image data of the detector; a defect calibration map comprising a single file including a plurality bitplanes, the bitplanes comprising, a first bitplane configured to store a factory calibration, at least one second bitplane configured to store a second operator updated calibration that is repeatedly updated, and at least one third bitplane configured to store a third calibration update that is repeatedly updated without the operator, where the at least one third bitplane is updated more frequently than the at least one second bitplane, the defect calibration map is accessible to the computer. In one embodiment, defect map updates can be generated from imaging procedures such as dark imaging, diagnostic image captures and flat field imaging procedures (e.g., calibration procedure used for other purposes such as but not limited to gain calibration).

While the invention has been illustrated with respect to one or more implementations, alterations and/or modifications can be made to the illustrated examples without departing from the spirit and scope of the appended claims. In addition, while a particular feature of the invention can have been disclosed with respect to at least one of several implementations/embodiments, such feature can be combined with one or more other features of the other implementations/embodiments as can be desired and advantageous for any given or particular function. The term "at least one of" is used to mean one or more of the listed items can be selected. The term "about" indicates that the value listed can be somewhat altered, as long as the alteration does not result in nonconformance of the process or structure to the illustrated embodiment. Finally, "exemplary" indicates the description is used as an example, rather than implying that it is an ideal. Other embodiments of the invention will be apparent to those skilled in the art from consideration of the specification and practice of the invention disclosed herein. It is intended that the specification and examples be considered as exemplary only. The scope of the invention is indicated by the appended claims, and all changes that come within the meaning and range of equivalents thereof are intended to be embraced therein.

What is claimed is:

1. A method for monitoring the state of calibration of a digital x-ray detector, the detector comprising a solid state sensor with a plurality of pixels, a scintillating screen and at least one embedded microprocessor, the method comprising using a signal processing device, comprising:
   setting a calibration operating mode of the detector including setting a voltage bias of the plurality of pixels at a first voltage level;
   capturing a plurality of dark images in the calibration mode while maintaining the voltage bias of the plurality of pixels at the first voltage level;
   resetting the voltage bias to a second voltage level different from the first voltage level only after the step of capturing the plurality of dark images;
   determining a dark difference image between two captured dark images that were captured last in time of the captured plurality of dark images; and
   identifying defective pixels in the dark difference image that differ by over at least one preselected threshold deviation amount from other pixels in the dark difference image.

2. The method according to claim 1, where the two dark images have different integration times.

3. The method according to claim 1, comprising:
   turning on an imaging array of the detector; and
   performing an initialization operation to inject charge into the pixels of the imaging array.

4. The method according to claim 1, where identifying pixels comprises:
   determining a local median at each pixel location in the dark difference image; and
   determining a pixel is defective when a threshold measure between the local median at a pixel location and a pixel value at the pixel location in the dark difference image is exceeded.

5. The method according to claim 4,
   wherein the threshold deviation amount is a fraction of the median image or where the threshold deviation amount is a fraction of the robust standard deviation of the image.

6. The method according to claim 4, where the local median is determined using a median filter that is a set of 4 adjacent pixels, a set of 8 adjacent pixels, a subset of adjacent pixels, a filter of a prescribed size, a X-by-X square filter where X is an integer greater than 2, a X-by-Y rectangular filter where Y is an integer greater than 2 and not equal to X.

7. The method according to claim 1, comprising initiating the calibration mode occurs after detected shock events to the detector, periodically, after a set number of exposures of the detector have been taken, after a time has elapsed, based on temperature, or by operator action.

8. The method according to claim 1, comprising;
   replacing a current updated defect map with the newly identified defective pixels to generate a replacement updated defect map; and
   combining the replacement updated defect map with a factory defect map.

9. The method according to claim 1, comprising correcting portions of radiographic images for any identified defective pixels.

10. The method according to claim 1, comprising:
    powering up the imaging array of the detector;
    obtaining at least one of:
       a first dark difference image using two dark images obtained with different integration times;
       a second dark difference image using two or more dark images obtained by performing N initialization cycles before a first of the two or more dark images and by performing M initialization cycles before a second of the two or more dark images, where M and N are positive integers and the initialization cycles comprises at least one fill and one spill cycle;
       a third dark difference as the second dark difference but with a different integration time;
       a fourth dark difference image using at least two dark images obtained by performing an initialization operation to inject charge into the pixels;
       a fifth dark difference image using more than one dark image obtained by performing a first refresh operation before a first of the more than one dark image and a second refresh operation before a second of the more than one dark image, where the second refresh operation is different from the first refresh operation;
    powering down the detector between all sets of dark images; and
    identifying defective pixels using one or more of the first through the fifth dark difference image.

11. The method according to claim 10, where a pixel is identified as defective when a combination of two or more of the first dark difference image through the fifth dark difference image identify the pixel as defective.

12. The method according to claim 1, where at least one of the two captured dark images comprises combined values or averaged values of multiple dark images obtained under the same conditions, further comprising correcting the two dark images for defect, where the signal processing device is a computer or an embedded microprocessor.

13. A system for monitoring the state of calibration of a digital x-ray detector, the detector comprising a solid state sensor with a plurality of pixels and at least one embedded microprocessor, the system comprising:

a computer operable during normal diagnostic use of the detector for accessing a digital image including digital image data of the detector;

the at least one embedded microprocessor configured to set a calibration operating mode of the detector including setting a voltage bias of the plurality of pixels at a first voltage level;

means for initializing the portable detector in the calibration mode and capturing a plurality of dark images in the calibration mode while maintaining the voltage bias of the plurality of pixels at the first voltage level;

means for resetting the voltage bias to a second voltage level different from the first voltage level only after capturing the plurality of dark images; and the at least one embedded microprocessor or the computer configured to determine a dark difference image between two captured dark images that were captured last in time of the captured plurality of dark images and identify defective pixels in the dark difference image that differ by over a threshold amount from other pixels in the dark difference image.

14. The system according to claim 13, where the detector is portable, comprising a scintillating screen, a battery and supporting a wireless link to the computer, where the means for initializing powers up the digital x-ray detector.

15. The system according to claim 13, where the detector comprises:

at least one shock sensor for monitoring mechanical shock to the detector, and the system further comprises means for alerting a system user to conduct a calibration of the detector when a preselected shock threshold value has been exceeded.

16. A calibration system for monitoring the state of calibration of a radiographic detector, the detector comprising a solid state sensor with a plurality of pixels and at least one embedded microprocessor, the detector comprising:

a computer operable during normal diagnostic use of the detector for accessing a digital image including digital image data of the detector;

a defect calibration map comprising a single file including a plurality of bitplanes, the bitplanes comprising, a first bitplane configured to store a factory calibration, at least one second bitplane configured to store a second operator updated calibration that is repeatedly updated, and at least one third bitplane configured to store a third calibration update that is repeatedly updated without the operator, where the at least one third bitplane is updated more frequently than the at least one second bitplane, where the defect calibration map is accessible to the computer.

17. The calibration system of claim 16, where the at least one second bitplane comprises one bitplane to store a flat field defect map update generated from a flat field calibration procedure and another bitplane to store a gain defect map update generated from a gain calibration procedure, and where the at least one third bitplane comprises one bitplane to store one defect map update generated from a first dark image procedure and another bitplane to store a defect map update generated from a second different dark image procedure, where a composite defect calibration map is generated from logically combining the first bitplane, the at least one second bitplane, and the at least one third bitplane, and where each bitplane comprises an ordered array.

18. A method of operating a digital radiographic detector comprising an array of imaging pixels, the method comprising:

powering up the array of imaging pixels;

obtaining a first dark difference image using two dark images each obtained using a different integration time, wherein the integration time is a time duration during which accumulated charges in the imaging pixels caused by a radiographic exposure are measured, and wherein the first dark difference image is determined using the difference between the two dark images;

powering down the detector after obtaining said first dark difference image; and identifying defective pixels in the array of imaging pixels using said first dark difference image.

19. The method according to claim 18, further comprising:

obtaining a second dark difference image using a pair of dark images obtained by performing N initialization cycles before obtaining a first of the pair of dark images and by performing M initialization cycles before obtaining a second of the pair of dark images, wherein M and N are positive integers, and wherein each of the initialization cycles comprise at least one fill and one spill cycle, wherein the second dark difference image is determined using the difference between the pair of dark images; and obtaining a third dark difference image determined using the difference between the pair of dark images wherein the pair of dark images are each obtained using a different integration time, wherein the step of powering down the detector is performed after obtaining each of the first, second, and third dark difference images, and wherein the step of identifying defective pixels includes using at least two of the first, second, and third dark difference images.

20. The method according to claim 19, further comprising determining row and column locations of all defective pixels in the array of imaging pixels relative to a zero position in the array.

\* \* \* \* \*